Patented Oct. 27, 1931

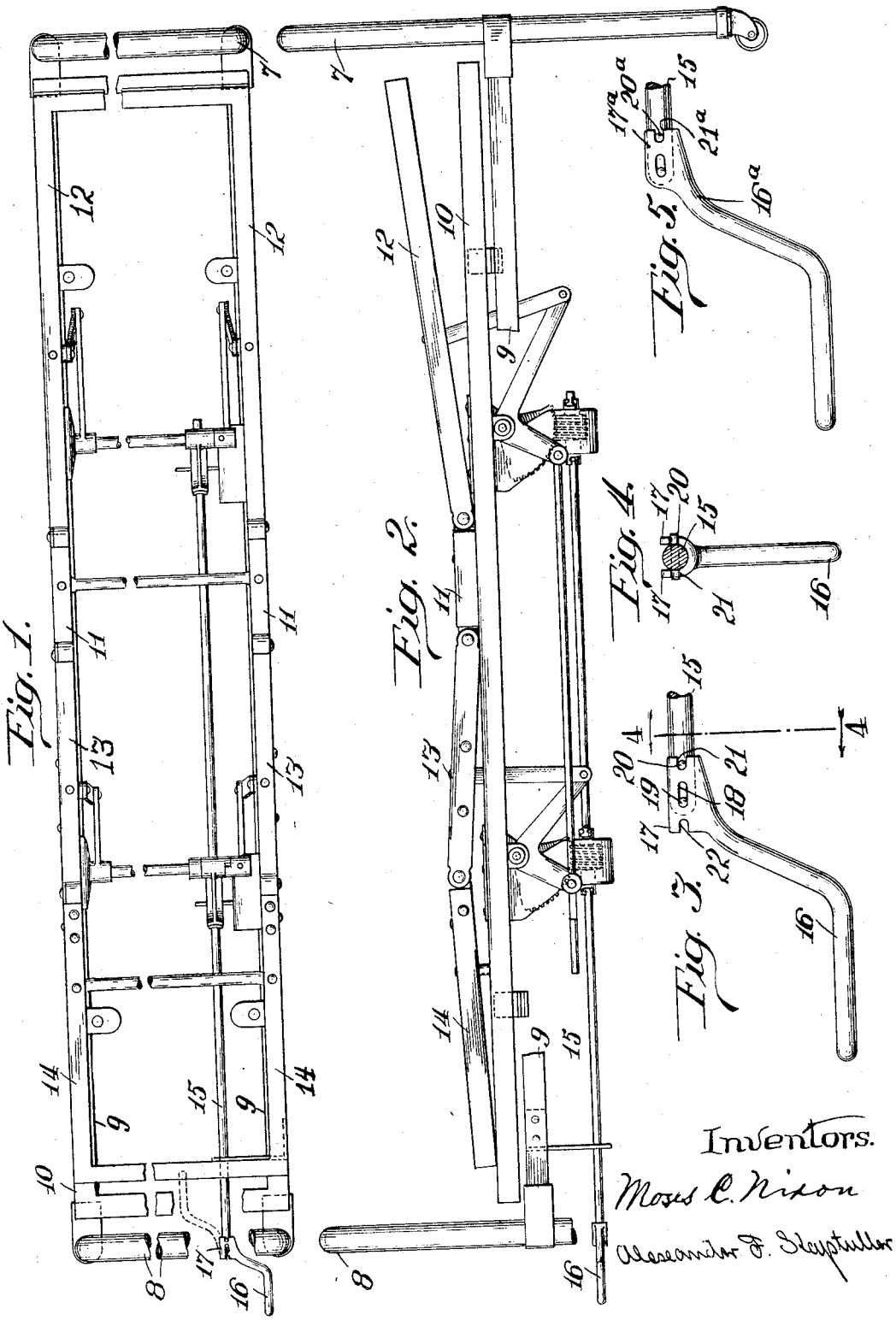

1,828,980

UNITED STATES PATENT OFFICE

MOSES C. NIXON AND ALEXANDER F. KAPTULLER, OF CHICAGO, ILLINOIS, SAID KAPTULLER ASSIGNOR TO SAID NIXON

CRANK MEANS FOR BED OPERATING MECHANISM

Application filed April 7, 1930. Serial No. 442,230.

The invention relates to operating means for the pivoted sections of beds and attachments of the type shown and described in our copending application Serial No. 367,328, filed May 31, 1929, of which this application is in part a continuation; and more particularly the invention relates to the crank means of the operating means employed for raising and lowering the pivoted bed sections.

One of the objects of the invention is to provide an improved crank for the driving member or shaft so arranged that the crank may be readily swung into either the operative or non-operative position. It is another object of the invention to provide improved means for locking the crank in its inoperative position as well as its operative position. Other objects of the invention will appear from the following description taken in connection with the accompanying drawings, in which:

Figure 1 is a plan view of a bed structure equipped with crank operating means embodying the principles of the invention; Fig. 2 is a side elevational view of the structure; Fig. 3 is an enlarged view of a crank which is preferably provided for the operating mechanism of the bed; Fig. 4 is a sectional view taken on line 4—4 of Fig. 3; and Fig. 5 is a side view of a modified form of the crank means.

Like characters of reference indicate like parts in the several views, and referring to the same, 7 and 8 denotes the head and foot respectively, and 9 the side rails of a bed, and supported thereby is a self-contained independent apparatus of which the frame 10, preferably of angle bars, forms a supporting base frame. In the present case the frame 10 carries an adjustable sectional frame consisting of a rigidly secured central section 11, body and thigh supporting sections 12 and 13 pivotally attached at one end to the respective ends of the central section, a leg section 14 pivotally attached to the free end of the thigh section, and means for adjusting the several pivotally attached sections, said means including a rotatable shaft or member 15 for adjusting the several pivotally attached sections, said means including a rotatable shaft or member 15 for adjusting the several pivotally attached sections, all of which has been more fully described in our aforesaid pending application, said shaft being provided with a crank or handle 16.

As clearly shown in Figs. 3 and 4 the head or attached end of the crank or handle is formed to provide spaced arms or portions 17 adapted to embrace opposite sides of the shaft 15. The arms 17 are provided with registering slots 18 which receive the opposite ends of a transverse pin 19 carried by the shaft. Means is provided for effectively connecting or holding the crank-head against swinging movement when the crank is in its operative position and preferably also when the crank is in its inoperative position as shown by the dotted lines in Fig. 1. The last mentioned means preferably comprises a pin 20 which projects laterally from the shaft 15 which is adapted to enter an open slot 21 formed in the forward end of the crank arms 16 when the shaft is in its operative or full line position and to enter the open slot 22 in the opposite end of the crank arm when the crank is in its non-operative or dotted line position.

In the embodiment shown in Fig. 5 the crank 16ª is provided only with an open notch 21ª in the forward end of the crank arms 17ª for receiving the pin 20ª, the crank being connected in its operative position to the shaft in the same manner as in the embodiment heretofore described. In this modified construction, the crank may be swung into the dotted line position shown in Fig. 1 also, no provision being made, however, for locking it in such non-operative position.

While we have illustrated and described certain preferred embodiments of the invention we do not wish to be limited to the particular construction shown and described, except only so far as the claims may be limited by the prior art.

What we claim is:

1. In operative means for a pivoted section of a bed of the class described, the combination of a rotatable member, two elements projecting laterally from said member, a crank pivotally and slidably secured on said member by one of said elements, and means carried by the crank adapted to co-engage with the other of said elements upon sliding the crank on said member for holding the crank in operative position.

2. In operative means for a pivoted section of a bed of the class described, the combination of a rotatable member, two pins projecting laterally from said member, a crank pivotally and slidably mounted on one of said pins, and spaced elements carried by the crank and adapted to straddle the other of said pins upon sliding the crank on said member for holding the crank in operative position.

3. In operative means for a pivoted section of a bed of the class described, the combination of a rotatable member, a pivot pin and an element extending laterally from the rotatable member, a crank having a hub provided with a slot adapted to co-engage with said pin for pivotally and slidably securing the crank on said member, and means carried by the crank hub adapted to co-engage with said element upon sliding the crank on the rotatable member for holding the crank in operative position.

4. In operative means for a pivoted section of a bed of the class described, the combination of a rotatable member, two elements extending laterally from said member, a crank having a hub provided with slots registering with one of said elements for pivotally and slidably securing the crank to the rotatable member, and spaced elements carried by one end of the crank hub and adapted to straddle the other of said extending elements for holding the crank in operative position.

5. In operative means for a pivoted section of a bed of the class described, the combination of a rotatable member, two elements projecting laterally from said member, a crank pivotally and slidably secured on said member by one of said elements, means carried on opposite ends of the crank head, one of which being adapted to co-engage with the other of said elements upon sliding the crank on said member for holding the crank in operative position, and the other set of which being adapted also to co-engage with said element upon reversal of position of the crank and sliding it on said member for holding the crank in non-operative position.

6. In operative means for a pivoted section of a bed of the class described, the combination of a rotatable member, two pins projecting laterally from said member, a crank pivotally and slidably secured on said member by one of said pins, and a set of spaced elements on opposite ends of the crank head, one set of which is adapted to straddle the other of said pins upon sliding the crank on the rotatable member for holding the crank in operative position, and the other set of which is adapted also to straddle said pin upon reversal of position of the crank and sliding it on said member for holding it in non-operative position.

7. In operative means for a pivoted section of a bed of the class described, the combination of a rotatable member, a pivot pin and an element extending laterally from the rotatable member, a crank provided with a slot adapted to co-act with said pin for pivotally and slidably securing the crank on said member, and means carried on opposite ends of the crank head, one of which is adapted to co-engage with said element upon sliding the crank on said member for holding the crank in operative position, and the other of which is adapted also to co-engage with said element upon reversal of position of the crank and sliding it on said member for holding the crank in non-operative position.

8. In operative means for a pivoted section of a bed of the class described, the combination of a rotatable member, elements extending laterally from said member, a crank having a hub provided with slots registering with one of said elements for pivotally and slidably securing the crank on the rotatable member, and a set of spaced elements carried by the opposite ends of the crank hub, one set of which being adapted to straddle the other of said elements upon sliding the crank on said member for holding the crank in operative position, and the other set being adapted also to straddle said element upon reversal of position of the crank and sliding it on said member for holding the crank in non-operative position.

9. In operative means for a pivoted section of a bed of the class described, the combination of a rotatable member, a crank having a hub provided with a slot and mounted on said member, an element carried by the rotatable member and extending into said slot for pivotally and slidably securing the crank on the rotatable member, a member extending laterally from the rotatable member, and means carried by the crank hub adapted to co-engage with said extending member for holding the crank in operative position.

10. In operative means for a pivoted section of a bed of the class described, the combination of a rotatable member, a crank having a hub provided with a slot and mounted on said member, an element carried by the rotatable member and extending into said slot for pivotally and slidably securing the crank on the rotatable member, a member extending laterally from the rotatable member, and means carried on opposite ends of the crank hub, one of which is adapted to co-engage with said extending member upon sliding the crank on the rotatable member for holding the crank in operative position, and the other of which is adapted also to co-engage with said extending member upon reversal of position of the crank and sliding it on said member for holding the crank in non-operative position.

MOSES C. NIXON.
ALEXANDER F. KAPTULLER.